J. W. FEY.
AUTOMOBILE SIGNAL.
APPLICATION FILED JULY 6, 1916.
1,225,022.
Patented May 8, 1917.
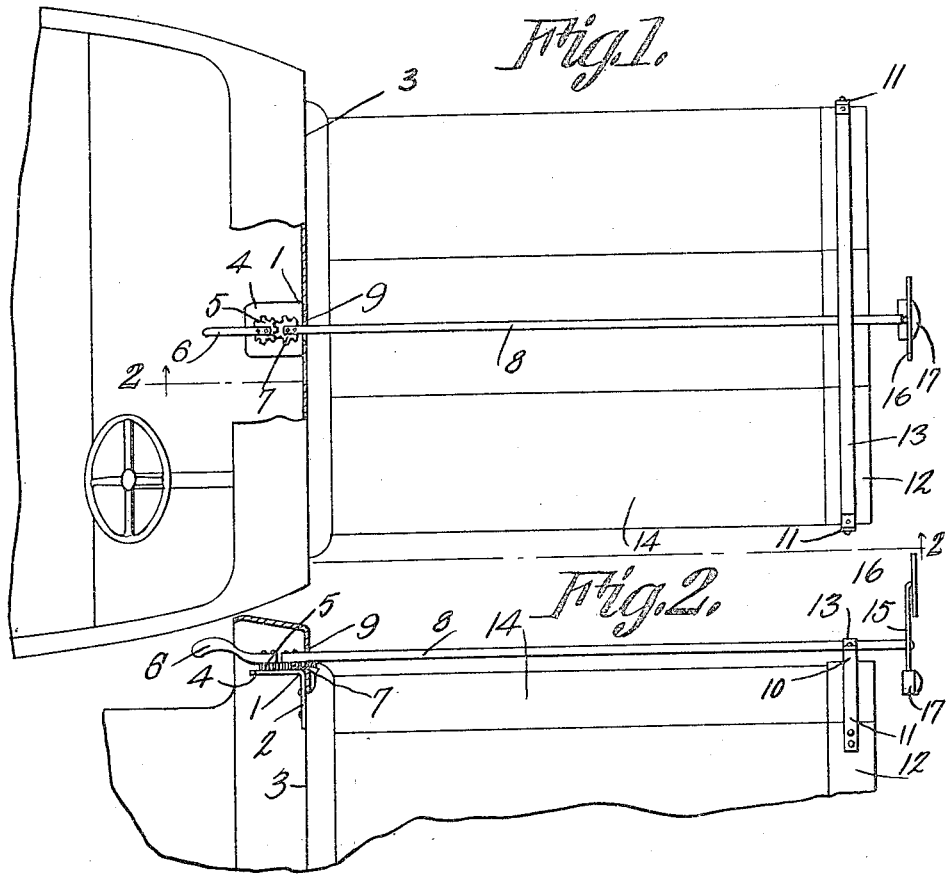
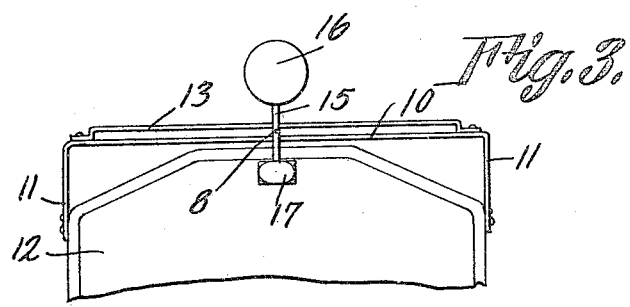
Witnesses
J. W. Fey,
Inventor
by
Attorneys

UNITED STATES PATENT OFFICE.

JOHN W. FEY, OF SHREVEPORT, LOUISIANA.

AUTOMOBILE-SIGNAL.

1,225,022.

Specification of Letters Patent.

Patented May 8, 1917.

Application filed July 6, 1916. Serial No. 107,826.

*To all whom it may concern:*

Be it known that I, JOHN W. FEY, a subject of the Emperor of Germany, residing at Shreveport, in the parish of Caddo and State of Louisiana, have invented a new and useful Automobile-Signal, of which the following is a specification.

The present invention appertains to automobile signals, and aims to provide an extremely simple and inexpensive signal or semaphore readily applicable to various automobiles, and easily operated for indicating the intentions of the operator to turn to the right or left or to proceed straight ahead, in order to facilitate traffic at crossings, both with respect to other vehicles and pedestrians.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the device as applied to an automobile.

Fig. 2 is a side elevation thereof.

Fig. 3 is a front view.

In carrying out the invention, there is provided a bracket 1 in the form of an angle plate having the downwardly projecting arm 2 secured in any suitable manner to the dash 3 of the automobile and having its other arm projecting rearwardly from the dash to provide a shelf 4. A gear segment 5 is mounted for rotation upon the shelf 4 and has attached thereto a rearwardly projecting handle 6 which can be conveniently manipulated by the operator. A second gear segment 7 is mounted for rotation upon the shelf 4 in front of and in mesh with the segment 5, and a relatively long forwardly projecting arm 8 has its rear end secured upon the gear segment 7, and said arm projects through a slot 9 in the dash, although the arm 8 can extend over the dash in some cases.

In order to guide the forward end of the arm 8 for transverse movement across the forward end of the automobile, a transverse supporting bar 10 is disposed above the forward end of the machine and has its terminals bent downwardly, as at 11, and secured in any suitable manner to the radiator 12 or other suitable part of the machine. A guide bar 13 is disposed above the supporting bar 10 and has its ends offset downwardly and secured to the bar 10 to provide a slotted guide through which the arm 8 extends. The arm 8 extends above the hood 14 of the automobile, and the arm 8 can be of various lengths upon various automobiles, in order to properly reach slightly in advance of the radiator, as seen in Figs. 1 and 2. If necessary, an intermediate guide for the arm 8 similar to the guide above described can be used, especially when the arm 8 is relatively long, in case of a long hood upon a large automobile.

Attached to the forward free end of the arm 8 is a vertical member 15, which can be pivotally connected with the arm, if desired, whereby to permit the signal member to swing or oscillate. A signal disk 16 is secured to the upper end of the member 15 and is colored red, although it may be otherwise colored. A suitable lamp 17 can be attached to the lower end of the member 15 for signaling during the night time or darkness.

In operation, when the automobile is going straight ahead, the arm 8 is in intermediate position between the sides of the car, and by simply moving the handle 6 toward one side or the other, the arm 8 can be swung likewise. Thus, when the operator intends to turn to the right, the handle 6 is moved toward the right, thus swinging the arm 8 toward the right, and bringing the signal member to the right side of the machine, whereby to indicate to the other vehicles and pedestrians, the intentions of the operator to turn to the right. In a like manner, by moving the handle 6 to the left, the signal member can be moved to the left side, when the machine is to be turned to the left. When the signal member is at the center or intermediate position, this will indicate the intention of the operator to move straight ahead.

The present device is extremely simple and inexpensive in construction, and can be readily applied to various automobiles. The device does not involve any complicated or expensive mechanism, and is not apt to get out of order.

By pivotally connecting the member 15 with the forward end of the arm 8, it is possible to reverse the daylight signal member or disk 16 and the lamp 17 to bring either the disk or lamp uppermost, in daylight or darkness, respectively. In this connection it is to be noted, that the lowermost signal member carried by the member 15 must be of sufficient weight to hold the member 15 vertical when at a standstill. As illustrated, the lamp 17 is the heavier, thereby holding the disk 16 uppermost, but if the disk is heavier, then the member 15 will be reversed.

Having thus described the invention, what is claimed as new is:

An automobile signal comprising an arm, means for pivotally mounting the same for swinging movement upon an automobile so that the free end of the arm is movable to the opposite sides of the automobile, a vertical member pivotally connected with said arm to oscillate relative thereto, a daylight signal member upon one end of said member, and a lamp upon the other end of said member.

In testimony that I claim the foregoing as my own, I have hereto affixed my signature in the presence of two witnesses.

JOHN W. FEY.

Witnesses:
CLEM V. RATCLIFF,
D. R. SHARPE.

Copies of this patent may be obtained for five cents each, by addressing the "Commissioner of Patents, Washington, D. C."